(No Model.)
G. A. HUFF.
SNAP HOOK.
No. 370,333. Patented Sept. 20, 1887.
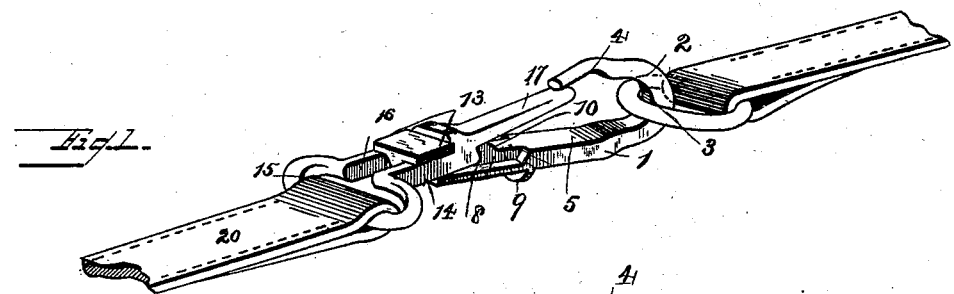
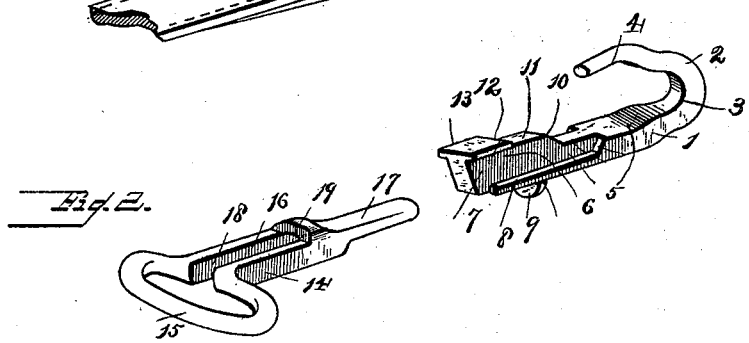
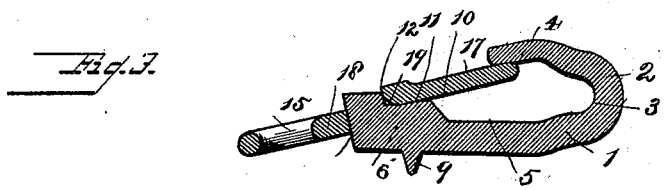
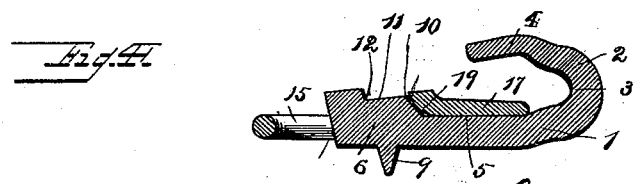
WITNESSES

UNITED STATES PATENT OFFICE.

GEORGE A. HUFF, OF ENGLEWOOD, ILLINOIS.

SNAP-HOOK.

SPECIFICATION forming part of Letters Patent No. 370,333, dated September 20, 1887.

Application filed February 14, 1887. Serial No. 227,484. (No model.)

*To all whom it may concern:*

Be it known that I, GEORGE A. HUFF, a citizen of the United States, and a resident of Englewood, in the county of Cook and State of Illinois, have invented certain new and useful Improvements in Snap-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved snap-hook, showing it attached to a strap and engaging a ring. Fig. 2 is a similar view of the two parts of the hook separated. Fig. 3 is a longitudinal sectional view of the hook, showing it closed, and Fig. 4 is a similar view of the hook, showing it open in position to receive the ring.

Similar numerals of reference indicate corresponding parts in all the figures.

My invention has relation to that class of snap-hooks in which the two parts of the hook slide upon each other, and in which no spring is required for bringing the latch into its proper position, closing the hook; and it contemplates certain improvements upon the hook for which Letters Patent No. 346,047 were granted to me on the 20th day of July, 1886; and it consists to that end in the improved construction and combination of parts of the same, as hereinafter more fully described and claimed.

In the accompanying drawings, the numeral 1 indicates the hook portion of the snap-hook, which hook portion is formed with the hook 2, having a portion, 3, in the doubled end for the reception of the ring or other object to which the hook is to be attached, and with the reduced free end 4, and with a recessed portion, 5, corresponding to the reduced free end and formed in the outer portion of the shank of the hook.

The shank 6 of the hook portion is formed with a reduced portion, 7, having flanges 8 upon the outer edge, and with a lip, 9, projecting from the said flanged edge of the reduced or flat portion; and the inner edge of the flat portion is formed with an oblique shoulder, 10, facing toward the outer end of the hook, and with a slightly-inclined inner edge, 11, inclined toward the rear or inner end of the shank, the end of the inner edge being formed with a low shoulder, 12, and with laterally-projecting flanges 13.

The latch portion 14 of the snap-hook is formed with a wide flat eye, 15, and with a longitudinally-slotted shank, 16, and with a latch end, 17, and the slotted shank fits with its slot 18 upon the flat shank of the hook, being slipped upon the same by inserting the flanged portion of the inner edge of the shank of the hook portion into the flat eye of the latch portion, when the slot may fit upon the flat shank of the hook portion, and may be slid so as to bring the rear ends of the slot under the flanges. The outer end of the slot is formed with an inclined portion, 19, extending under the latch end, and this inclined portion may slide against the inclined shoulder at the outer end of the flat shank, causing the latch end of the latch to bear against the reduced portion of the hook as the latch is drawn rearward by its eye, the inclined portion of the slot being drawn over the inclined shoulder and resting upon the rearwardly-inclined edge, when the end of the latch is bearing against the end of the hook.

It will be seen that when the strap 20 is removed from the eye of the latch the latch may be forced forward sufficiently far in the hook to allow the flanged rear end of the shank of the hook portion to slip into the eye and thus to allow the two parts of the snap-hook to be separated; but when the parts have been placed together the strap, being inserted into the eye, will prevent the said flanged end of the hook portion from being drawn far enough back to allow the parts to be separated, so that the strap will lock the two parts of the snap-hook together. The weight of the latch portion and of the strap will draw the said portion sufficiently far back to hold the end of the latch against the end of the hook, thus closing the hook; and when it is desired to either engage or disengage the hook with or from a ring the hook portion may be drawn back by placing the finger upon the lip of the said portion, sliding the hook portion in the slot of the latch portion and causing the end of the latch to be disengaged from the end of the hook and to be placed to rest in the reduced inner part of the hook, allowing the hook to be freely slipped upon the ring, when the weight of the latch and strap, on being released, will draw the latch in position, closing the hook.

It will thus be seen that the snap-hook is simply constructed of two pieces, which are not liable to become worn or to be broken, and there are no pivotal bolts, rivets, or springs in the snap-hook to become worn or to break, thus rendering the hook simple and durable.

Having thus described my invention, I claim and desire to secure by Letters Patent of the United States—

In a snap-hook, the combination of the hook portion having a hooked end formed with a reduced outer end and with a reduced corresponding inner portion, and having a flat shank formed with flanges upon the outer edge and with a lip upon the said edge, and formed with an outwardly-facing inclined shoulder upon the inner edge and with a slightly-inclined portion at the inner edge having a rear flanged and raised portion, and a latch portion having a wide eye and a shank formed with a longitudinal slot opening into the eye and formed with an inclined outer end, and having a latch end fitting into the reduced portions of the hook, as and for the purpose shown and set forth.

In testimony that I claim the foregoing as my own I have hereunto affixed my signature in presence of two witnesses.

GEORGE A. HUFF.

Witnesses:
DANIEL H. BROWN,
FRANK R. GOSNEY.